United States Patent

[11] 3,624,515

[72] Inventors John R. Rezek
Addison;
Joseph F. Cramer, Jr., Downers Grove,
both of Ill.

[21] Appl. No. 744,836
[22] Filed July 15, 1968
[45] Patented Nov. 30, 1971
[73] Assignee Motorola, Inc.
Franklin Park, Ill.

[54] ULTRAHIGH FREQUENCY TUNER WITH HELICAL RESONATORS COUPLED THROUGH APERTURES IN SHIELDS
6 Claims, 5 Drawing Figs.

[52] U.S. Cl. ........ 325/462, 325/357, 325/490, 334/74, 334/85
[51] Int. Cl. ........ H04b 1/16, H04b 1/08
[50] Field of Search ........ 325/452, 462, 490, 357; 334/74, 85

[56] References Cited

UNITED STATES PATENTS

| | | | |
|---|---|---|---|
| 2,753,457 | 7/1956 | Bell | 250/40 |
| 3,307,121 | 2/1967 | Loos | 334/6 |
| 3,479,622 | 11/1969 | Freer | 334/85 |
| 2,753,530 | 7/1956 | Horvath | 333/73 |
| 2,780,727 | 2/1957 | Dreyer | 250/40 |
| 2,833,994 | 5/1958 | Pipes | 333/73 |
| 2,868,983 | 1/1959 | Ketchum | 250/40 |

*Primary Examiner*—Robert L. Griffin
*Assistant Examiner*—Kenneth W. Weinstein
*Attorney*—Mueller and Aichele

ABSTRACT: Tuner for miniature radio receiver operating at ultrahigh frequency including coils and individual conductive shields forming helical resonators. The coils are tuned at the low-impedance end by aluminum slugs providing low loss, and may be capacitively loaded at the high-impedance end. Apertures in the shields provide coupling between the adjacent resonators, with the aperture in one shield being of the size to control the coupling and the aperture in the adjacent shield being larger so that it does not affect the coupling.

INVENTORS
JOHN R. REZEK,
JOSEPH F. CRAMER JR.
BY
Mueller, Aichele + Rauner
ATTYS.

ULTRAHIGH FREQUENCY TUNER WITH HELICAL RESONATORS COUPLED THROUGH APERTURES IN SHIELDS

BACKGROUND OF THE INVENTION

In miniature radio receivers, such as paging receivers that are carried in a pocket or in the hand, there is a problem in providing tuning elements of small size which have the required selectivity at ultra-high frequencies (UHF). Commonly used capacitive and inductive elements are not suitable for use in such receivers. Helical resonators which have been used at such frequencies have had cast shields which result in large size and high cost. Strip line techniques have been proposed, but available structures suitable for use below a thousand megaHertz have been both objectionably large and expensive.

SUMMARY OF THE INVENTION

It is an object of the present invention to provide an improved tuner for a miniature radio receiver operating in the ultra-high frequency range.

Another object of the invention is to provide a tuner including helical resonators of compact and inexpensive construction.

A further object of the invention is to provide a tuner for operation in the 450 megaHertz range having high Q and effective shielding.

A feature of the invention is the provision of a UHF tuner formed by coils in copper shield cans, with apertures in the shield cans for coupling signals from one coil to the next. The coils are tuned by conductive cores at the low-impedance end, and may have a loading capacitor at the high-impedance end.

The tuner of the invention includes a plurality of helical resonator sections formed by coils within inexpensive rectangular shields. The coils are provided on tubular forms mounted in an insulating board on which printed conductors are provided and which forms the chassis of the radio receiver. Aluminum slugs are threaded in the coil forms adjacent the low-impedance end of the coils to adjust the frequency while providing low loss. The rectangular shields have slots in the engaging walls thereof for coupling between adjacent coils. In each pair of engaging walls, one wall has a slot of a size to define the desired coupling and the other slot has a larger opening so that it does not alter the amount of coupling. The first coil may be coupled to an RF amplifier transistor and tuned by a parallel capacitor and/or a series capacitor. The second coil is tuned by a fixed capacitor connected between the high-impedance end of the coil and the shield. The third coil forms the output of the tuner and may be tuned by a fixed capacitor connected between the coil and the shield, and/or by the input capacity of the following mixer transistor.

DETAILED DESCRIPTION OF EMBODIMENT ILLUSTRATED

Figure 1:
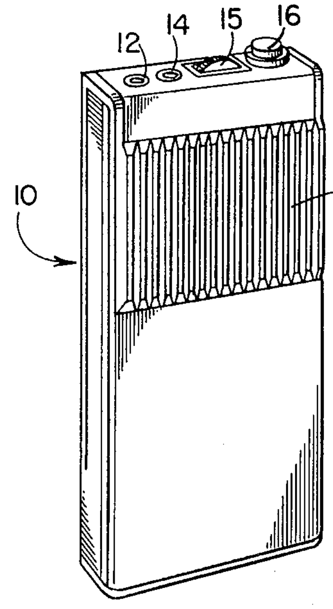
FIG. 1 illustrates a miniature radio receiver including the tuner of the invention.

FIG. 1 illustrates a miniature radio receiver in which the tuner of the invention can be used. This receiver is for use in the ultra-high-frequency band for frequencies of the order of 450 megaHertz. This receiver includes a housing 10 having a louvered section 11 through which sound from a loudspeaker can pass. The unit may have a built-in antenna, and includes a socket 12 for receiving a connection from an external antenna, and a socket 14 for connecting a separate speaker or earphone. Control 15 may operate an on-off switch and a volume control. A further control 16 is illustrated which may actuate a switch to provide a different mode of operation of the receiver. The receiver shown in FIG. 1 is of a size to be carried in the pocket or to be held in the hand of the user. It may be about 5 inches long, 2-½ inches wide and 1-1/6 inches thick.

Figure 2:
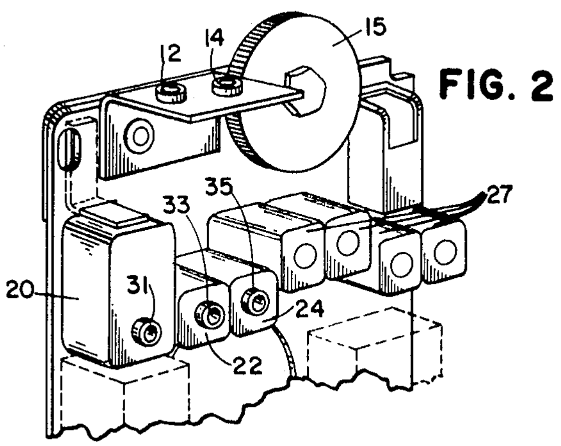
FIG. 2 is a perspective view of a portion of the chassis of the receiver showing the tuner.

FIG. 2 shows a portion of the receiver chassis for the receiver illustrated in FIG. 1. Signals picked up by an antenna are applied to the radiofrequency amplifier which includes the tuner, and which is provided within the shield cans 20, 22 and 24. Shield cans 27 house other stages of the receiver. The shield cans are formed of thin conductive metal, such as copper sheet.

Figure 3:
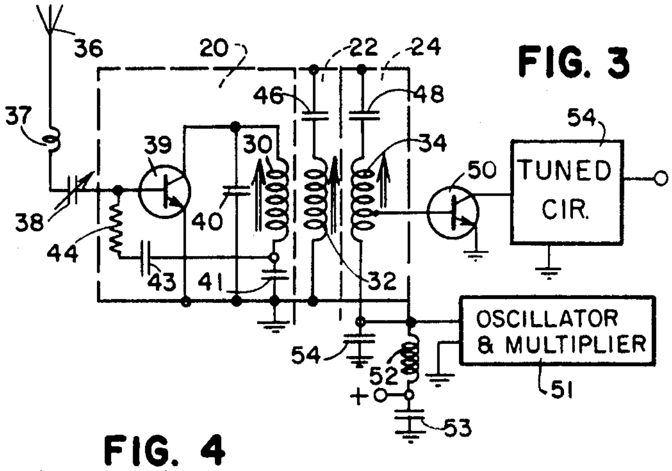
FIG. 3 is a circuit diagram illustrating the circuit of the tuner and the elements connected thereto.

FIG. 3 illustrates the circuit of the radiofrequency amplifier, and the elements of the receiver connected thereto. This includes the tuner formed by helical resonators connected to each other and including coils 30, 32 and 34 provided in the shields 20, 22 and 24, respectively (FIG. 2). The shields are represented by the dotted enclosures marked 20, 22 and 24 in FIG. 3.

Considering the circuit connections and operation, signals from an antenna 36 are applied through a coupling circuit including coil 37 and capacitor 38 to the base electrode of transistor 39. Output signals from the collector of transistor 39 are applied to the tuned circuit including coil 30, and capacitors 40 and 41. Feedback from the tuned circuit is applied through capacitor 43 and resistor 44 to the base electrode of transistor 39. All of the components of the radiofrequency amplifier including transistor 39, the tuned circuit including coil 30 and capacitors 40 and 41, and the feedback circuit are provided within the shield 20.

Signals are inductively coupled between coils 30 and 32, with the coil 32 being tuned by capacitor 46 which is connected between the high-impedance end of the coil and the shield 22. Signals are inductively coupled from coil 32 to coil 34 which has a tap thereon connected to the base electrode of transistor 50, which functions as a mixer stage. The coil 34 is tuned, at least in part, by the input capacity of the mixer transistor 50. A fixed capacitor 48 can be connected from the high-impedance end of coil 34 to the shield can for tuning the same. Coils 30, 32 and 34 have cores extending into the low-impedance ends thereof to control the inductance, as will be further described.

Signals from local oscillator and multiplier 51 are applied to the tuned circuit including coil 52, capacitor 53 and capacitor 54 which is connected to the lower end of coil 34. The oscillator and multiplier may provide an eight times multiplication of a crystal frequency, and the tuned circuit formed by coil 52 and capacitor 54 will inject a signal which provides a further three times multiplication in the mixer stage 50. Bias potential is applied across capacitor 53 and through coils 52 and 34 to the base electrode of transistor 50. The local oscillator signals are applied with the selected radiofrequency signals to the base electrode of transistor 50 to provide an intermediate frequency output. The output of the mixer is derived from the collector of transistor 50 and applied to a tuned circuit 54 which selects signals at the predetermined intermediate frequency. This will be a much lower frequency and tuned circuits of known construction can be used to select the intermediate frequency signals.

Figure 4:
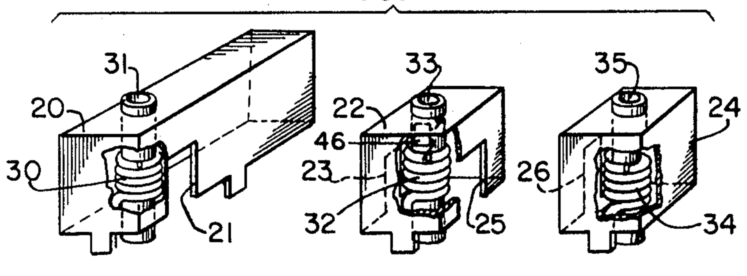
FIG. 4 shows in detail the construction of the coils and the shields of the tuner.

FIG. 4 shows in more detail the construction of the coils and the shields of the tuner, and this figure will be considered with FIG. 2. The coils 30, 32 and 34 are provided on coil forms 31, 33 and 35, respectively, which are mounted on the receiver chassis and extend through openings in the tops of the shields 20, 22 and 24. Shield 20 is illustrated as having a slot 21 in the wall thereof which engages a wall of the shield 22. The engaging wall of shield 22 has a slot 23 therein which is of a size to provide the desired coupling between coil 30 and coil 32. The slot 21 in shield 20 is larger than the slot 23 and therefore has no effect on the coupling. By making the slot 21 larger, the position of the shields 20 and 22 with respect to each other is not critical. If slots of the same size are used and the shields are not positioned in accurate alignment, the edges of the slots would provide an aperture smaller than either of the slots, with the size depending on the precise positions of the two shields.

The wall of the shield 22 engaging shield 24 has an aperture 25 therein and the wall of the shield 24 has an aperture 26 therein. Aperture 25 is larger than aperture 26 so that aperture 26 controls the coupling from coil 32 to coil 34. It will be apparent that either aperture can be the control aperture, and the other aperture can be larger so that it does not affect the coupling. The dimensions of the coils and the shields are related so that the capacity between each coil and its shield cooperates with the inductance of the coil to provide a capacitively loaded helical resonator at the desired frequency.

Figure 5:
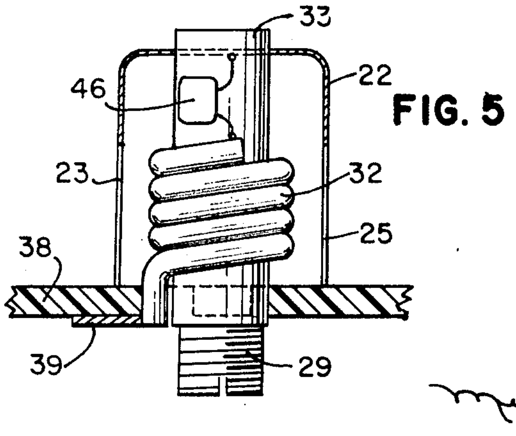
FIG. 5 is a cross-sectional view illustrating one coil and shield construction.

FIG. 5 is a cross-sectional view showing the helical resonator including the coil 32 and the shield 22. The coil 32 is machine wound and positioned on form 33 which is secured in an opening in the insulating chassis board 38. The form may be constructed of fiber glass and the chassis board may be formed of a glass epoxy resin. The coil can be provided as a winding metallized on a ceramic form. A connection from the coil 32 extends through the printed circuit board 38 and is soldered to a ground conductor 39 thereon. Capacitor 46 is connected between the high-impedance end of the coil and the shield 22 to provide a top-loading capacitor. In the tuner described for use at 450 megaHertz, capacitor 46 may have a value of 2.2 micromicrofarads. The coil 32 is wound from No. 18 copper wire with Formvar insulation.

The core 29 is threaded in the coil form 33 at the low-impedance end of the coil 32 to provide a fine adjustment of the inductance to thereby tune the helical resonator. Cores are also provided in coils 30 and 34. The cores are formed of conducting material, which may be aluminum, and are threaded into the low-impedance ends of the coil forms which are supported on the chassis for low loss of the radiofrequency energy. The coils 30 and 34, and the coil forms 31 and 35, on which they are positioned, may be constructed and supported on the chassis board in the same way as described for coil 32 and form 33.

The tuner structure which has been described has been found to be highly effective in a miniature paging receiver where size and weight must be strictly limited. The structure is very inexpensive, requiring no cast shields or special parts.

We claim:

1. A compact tuning circuit for operating at ultra-high frequencies including first and second coils, first and second conductive shields established at ground potential and positioned about said first and second coils, respectively, to form first and second helical resonators therewith, means having low impedance at said ultra-high frequencies for connecting one end of each of said coils to ground potential, a core made of conductive material positioned in said one end of each of said coils and movable therein for varying the inductance thereof, capacitor means connecting the other end of each coil to said shield thereabout, said cores being independent of said capacitor means and being the sole adjustable elements for changing the tuning of said resonators, said resonators being positioned with a wall of said first shield in engagement with a wall of said second shield, said engaging walls of said shields having openings therein for coupling signals from said first resonator to said second resonator, one of said engaging walls of said shields having a first opening therein of a size to control the coupling of signals from said first resonator to said second resonator, and the other one of engaging walls of said shields having a second opening therein larger than and positioned about said first opening for providing a clear passage for signals coupled through said first opening which is independent of the size of said second opening and of the alignment of said first and second shields.

2. A compact tuning circuit for operating at ultra-high frequency including first, second and third coils each having a core movable therein for varying the inductance thereof, individual conductive shields about said coils established at ground potential and positioned with respect to said coils to form helical resonators, said shields being positioned with a wall of one shield in engagement with a wall of another shield and with said walls having slots therein through which signals are coupled from said coil within said one shield to said coil within said other shield, first capacitor means connected to said first coil for tuning the same, second capacitor means connected between the high-impedance end of said second coil and said shield thereabout, third capacitor means connected between the high-impedance end of said third coil and said shield thereabout, means for applying signals to said first coil with said signals being coupled through said second coil to said third coil, and semiconductor means connected to a tap on said third coil for deriving signals therefrom and having capacitance which cooperates with said third capacitor means for tuning said third coil.

3. A tuned radiofrequency amplifier circuit including in combination, a first transistor having base, emitter and collector electrodes, means for applying radiofrequency signals between said base and emitter electrodes, a tuning circuit including a plurality of coils each having a core movable therein for varying the inductance thereof, individual conductive shields about said coils established at ground potential and positioned with respect to said coils to form helical resonators, said shields being positioned with a wall of one shield in engagement with a wall of another shield and with said walls having slots therein through which signals are coupled from said coil within said one shield to said coil within said other shield, one of said coils being connected to said collector electrode of said first transistor for receiving amplified signals therefrom, a second transistor having base, emitter and collector electrodes, means connecting said base electrode to another one of said coils for deriving signals therefrom, and tuned circuit means connected to said collector electrode of said second transistor.

4. The structure of claim 3 wherein one of the engaging walls of said shields has a first slot therein of a size to control the coupling between the coils in said shields, and the other one of the engaging walls has a second slot therein larger than said first slot so that the coupling is independent of the size of said second slot.

5. The structure of claim 3 wherein said tuning circuit includes first, second and third coils, and including tuned circuit means including said first coil connected to said collector electrode of said first transistor, a first capacitor connected between the high-impedance end of said second coil and said shield thereabout, a second capacitor connected between the high-impedance end of said third coil and said shield thereabout, and means connecting a tap on said third coil to said base electrode of said second transistor.

6. The structure of claim 5 wherein said cores are positioned in the low-impedance ends of said coils and are made of aluminum.

* * * * *